(12) United States Patent
Sachidanand Sinha et al.

(10) Patent No.: US 12,720,368 B2
(45) Date of Patent: Aug. 25, 2026

(54) SELECTION OF OPEN RADIO UNIT CAPABILITIES BASED ON CONFIGURED FEATURES

(71) Applicant: QUALCOMM Incorporated, San Diego, CA (US)

(72) Inventors: Abhishek Saurabh Sachidanand Sinha, San Diego, CA (US); Kalyan Kuppuswamy, San Diego, CA (US); Orod Raeesi, Espoo (FI); Deepak Agarwal, San Diego, CA (US); Michael Francis Garyantes, Bradley Beach, NJ (US); Rohan Salvi, San Diego, CA (US); Senthilkumar Sundaram, San Diego, CA (US); James Krysl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/481,956

(22) Filed: Oct. 5, 2023

(65) Prior Publication Data

US 2025/0119794 A1 Apr. 10, 2025

(51) Int. Cl.
*H04W 28/18* (2009.01)
*H04W 88/08* (2009.01)

(52) U.S. Cl.
CPC .......... *H04W 28/18* (2013.01); *H04W 88/085* (2013.01)

(58) Field of Classification Search
CPC ... H04W 28/18; H04W 88/085; H04W 72/51; H04W 24/02
See application file for complete search history.

(56) References Cited

U.S. PATENT DOCUMENTS 8,171,146 B2 * 5/2012 Chen .................. H04M 7/0072 709/228
2016/0192261 A1 * 6/2016 Wang .................. H04W 36/16 370/331

(Continued)

FOREIGN PATENT DOCUMENTS

CN 115134364 B * 6/2023 .......... H04L 41/145

OTHER PUBLICATIONS

O-RAN Alliance Working Group 4; Management Plane Specification, O-RAN Specifications—O-RAN.WG4.MP.0-V06.00, (Jan. 1, 2021), pp. 1-299 (Year: 2021).*

(Continued)

*Primary Examiner* — Yuwen Pan
*Assistant Examiner* — Swati Jain
(74) *Attorney, Agent, or Firm* — Harrity & Harrity, LLP

(57) ABSTRACT

Various aspects of the present disclosure generally relate to wireless communication. In some aspects, a network entity may transmit, to an open distributed unit (O-DU), a first set of capabilities of the network entity, the first set of capabilities including one or more of at least one O-RU capability or at least one endpoint capability. The network entity may receive, from the O-DU, an indication of one or more features configured by the O-DU. The network entity may select a second set of capabilities of the network entity based at least in part on the one or more features configured by the O-DU. The network entity may transmit, to the O-DU, the second set of capabilities of the network entity. Numerous other aspects are described.

30 Claims, 9 Drawing Sheets

(56) References Cited

U.S. PATENT DOCUMENTS

| | | | | |
|---|---|---|---|---|
| 2021/0385686 | A1* | 12/2021 | Ahmed | H04W 28/06 |
| 2023/0164679 | A1* | 5/2023 | Wang | H04W 24/02 370/329 |
| 2025/0080188 | A1* | 3/2025 | Mao | H04L 25/0202 |
| 2025/0081173 | A1* | 3/2025 | Umeda | H04W 8/24 |

OTHER PUBLICATIONS

Anonymous: "O-RAN Alliance Working Group 4 Management Plane Specification", O-RAN Specifications—O-RAN.WG4.MP.0-V06.00, O-RAN, DE vol. V06.00, Jan. 1, 2021, pp. 1-299, XP009543221, 206 Pages, paragraph [1.3.1], paragraph [04.8], paragraph [6.1.1], paragraph [6.1.2], paragraph [6.1.4], paragraph [06.2], paragraph [12.2.3], paragraph [12.3], paragraph [12.4].

International Search Report and Written Opinion—PCT/US2024/047937—ISA/EPO—Dec. 11, 2024.

* cited by examiner

SELECTION OF OPEN RADIO UNIT CAPABILITIES BASED ON CONFIGURED FEATURES

FIELD OF THE DISCLOSURE

Aspects of the present disclosure generally relate to wireless communication and to techniques and apparatuses associated with open radio unit (O-RU) capabilities.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Deployment of communication systems, such as 5G New Radio (NR) systems, may be arranged in multiple manners with various components or constituent parts. In a 5G NR system, a network node may be implemented in an aggregated or disaggregated architecture. For example, a base station (e.g., an evolved NB (eNB), a 5G NB or gNB), or one or more components performing base station functionality, may be implemented as a disaggregated base station (e.g., a disaggregated network node). A disaggregated base station may be configured to utilize a protocol stack that is physically or logically distributed among two or more units (such as one or more central units (CUs), one or more distributed units (DUs), or one or more radio units (RUs)). Disaggregated base stations may be utilized in an open radio access network (O-RAN (such as the network configuration sponsored by the O-RAN Alliance)) to facilitate scaling of communication systems by separating base station functionality into one or more units that can be individually deployed.

An open RU (O-RU) may support radio level capabilities (capacities) that apply to the entire O-RU or to endpoints of the O-RU. An endpoint may be a construct that represents a processing unit. An O-RU may have multiple endpoints. A capability at an endpoint may be an endpoint level capability. These capabilities may include static endpoints, static low level transmission endpoints, and static low level reception endpoints. Such endpoints may be bundled together in a static configuration. The O-RU may advertise the static configuration to an open DU (O-DU) at startup. Initially-advertised capabilities may be considered to be base capabilities.

The O-RU may transmit capability exchange parameters, such as a set of capabilities (e.g., base capabilities). The O-DU may support or be configured with certain features. The O-DU may identify features to support based on the set of capabilities. The O-DU may honor features indicated by the O-RU. The O-DU may transmit an indication of features configured by the O-DU.

However, there are factors that affect static capabilities supported by the O-RU. The O-RU may be able to advertise a set of features that include enhanced endpoint capabilities (capacities beyond base capabilities), but the O-DU may not support some of the features and thus it is unclear which enhanced endpoint capabilities the O-DU may apply or not apply. The O-DU may determine to enable or disable certain features that the O-RU advertises. The O-RU does not have a way to indicate that if the O-DU does not support a given feature or determines to disable a given feature, the O-RU may have its capabilities reduced below what the O-RU advertised at startup (e.g., become read only capabilities). This can negatively impact the overall capacity of the O-RU. Also, the O-RU may support only one optional feature that will help the O-RU enhance its processing (e.g., reflected in either supporting more layers or more carriers). There is no mechanism to help the O-RU advertise its enhanced capabilities if more than one enhanced feature is supported by the O-RU. In addition, the O-RU and the O-DU may be operating with different versions of features or capabilities. Furthermore, the O-DU may determine to configure any combination of component carriers (CCs) after the O-RU advertised per band support. The configured combination may impact endpoint capacity, and an endpoint capacity may be associated with a specific CC. Such impacts may reduce the processing capacity of the O-RU, which may introduce latency.

According to various aspects described herein, the endpoint and O-RU level capabilities for an O-RU may be negotiated. For example, the O-RU may transmit a first set of capabilities (e.g., overall O-RU capabilities and/or endpoint-specific capabilities). The O-DU may indicate features configured at the O-DU. The O-RU may select a second set of capabilities based at least in part on the configured features. The O-RU may add, remove, or change parameters for O-RU capabilities or endpoint capabilities in the first set of capabilities to form the second set of capabilities. For example, a certain beam capability may be advertised by the O-RU as a base capability in the first set of capabilities. The O-DU may indicate support for the base capability. However, on top of the base capability, the O-DU may indicate support for an enhanced total number of beams that can be supported per endpoint or an enhanced total number of beams that can be supported by the O-RU. The O-DU may honor this second set of capabilities. The O-RU may be able to increment a beam capability and indicate that the new beam capability in the second set of capabilities. In this way, the O-RU and the O-DU may negotiate enhanced capabilities to optimize the capabilities of the O-RU.

Some aspects described herein relate to a method of wireless communication performed by a network entity. The method may include transmitting, to an O-DU, a first set of capabilities of the network entity, the first set of capabilities including one or more of at least one O-RU capability or at least one endpoint capability. The method may include receiving, from the O-DU, an indication of one or more features configured by the O-DU. The method may include selecting a second set of capabilities of the network entity based at least in part on the one or more features configured by the O-DU. The method may include transmitting, to the O-DU, the second set of capabilities of the network entity.

Some aspects described herein relate to a method of wireless communication performed by a network entity. The method may include receiving, from an O-RU, a first set of capabilities that include one or more of at least one O-RU capability or at least one endpoint capability. The method may include transmitting, to the O-RU, an indication of one or more features configured by the network entity when operating as an O-DU. The method may include receiving, from the O-RU, a second set of capabilities that is different than the first set of capabilities.

Some aspects described herein relate to an apparatus for wireless communication at a network entity. The apparatus may include one or more memories and one or more processors coupled to the one or more memories. The one or more processors may be configured to transmit, to an O-DU, a first set of capabilities of the network entity, the first set of capabilities including one or more of at least one O-RU capability or at least one endpoint capability. The one or more processors may be configured to receive, from the O-DU, an indication of one or more features configured by the O-DU. The one or more processors may be configured to select a second set of capabilities of the network entity based at least in part on the one or more features configured by the O-DU. The one or more processors may be configured to transmit, to the O-DU, the second set of capabilities of the network entity.

Some aspects described herein relate to an apparatus for wireless communication at a network entity. The apparatus may include one or more memories and one or more processors coupled to the one or more memories. The one or more processors may be configured to receive, from an O-RU, a first set of capabilities that include one or more of at least one O-RU capability or at least one endpoint capability. The one or more processors may be configured to transmit, to the O-RU, an indication of one or more features configured by the network entity when operating as an O-DU. The one or more processors may be configured to receive, from the O-RU, a second set of capabilities that is different than the first set of capabilities.

Some aspects described herein relate to a non-transitory computer-readable medium that stores a set of instructions for wireless communication by a network entity. The set of instructions, when executed by one or more processors of the network entity, may cause the network entity to transmit, to an O-DU, a first set of capabilities of the network entity, the first set of capabilities including one or more of at least one O-RU capability or at least one endpoint capability. The set of instructions, when executed by one or more processors of the network entity, may cause the network entity to receive, from the O-DU, an indication of one or more features configured by the O-DU. The set of instructions, when executed by one or more processors of the network entity, may cause the network entity to select a second set of capabilities of the network entity based at least in part on the one or more features configured by the O-DU. The set of instructions, when executed by one or more processors of the network entity, may cause the network entity to transmit, to the O-DU, the second set of capabilities of the network entity.

Some aspects described herein relate to a non-transitory computer-readable medium that stores a set of instructions for wireless communication by a network entity. The set of instructions, when executed by one or more processors of the network entity, may cause the network entity to receive, from an O-RU, a first set of capabilities that include one or more of at least one O-RU capability or at least one endpoint capability. The set of instructions, when executed by one or more processors of the network entity, may cause the network entity to transmit, to the O-RU, an indication of one or more features configured by the network entity when operating as an O-DU. The set of instructions, when executed by one or more processors of the network entity, may cause the network entity to receive, from the O-RU, a second set of capabilities that is different than the first set of capabilities.

Some aspects described herein relate to an apparatus for wireless communication. The apparatus may include means for transmitting, to an O-DU, a first set of capabilities of the network entity, the first set of capabilities including one or more of at least one O-RU capability or at least one endpoint capability. The apparatus may include means for receiving, from the O-DU, an indication of one or more features configured by the O-DU. The apparatus may include means for selecting a second set of capabilities of the network entity based at least in part on the one or more features configured by the O-DU. The apparatus may include means for transmitting, to the O-DU, the second set of capabilities of the network entity.

Some aspects described herein relate to an apparatus for wireless communication. The apparatus may include means for receiving, from an O-RU, a first set of capabilities that include one or more of at least one O-RU capability or at least one endpoint capability; means for transmitting, to the O-RU, an indication of one or more features configured by the network entity when operating as an O-DU; and means for receiving, from the O-RU, a second set of capabilities that is different than the first set of capabilities.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
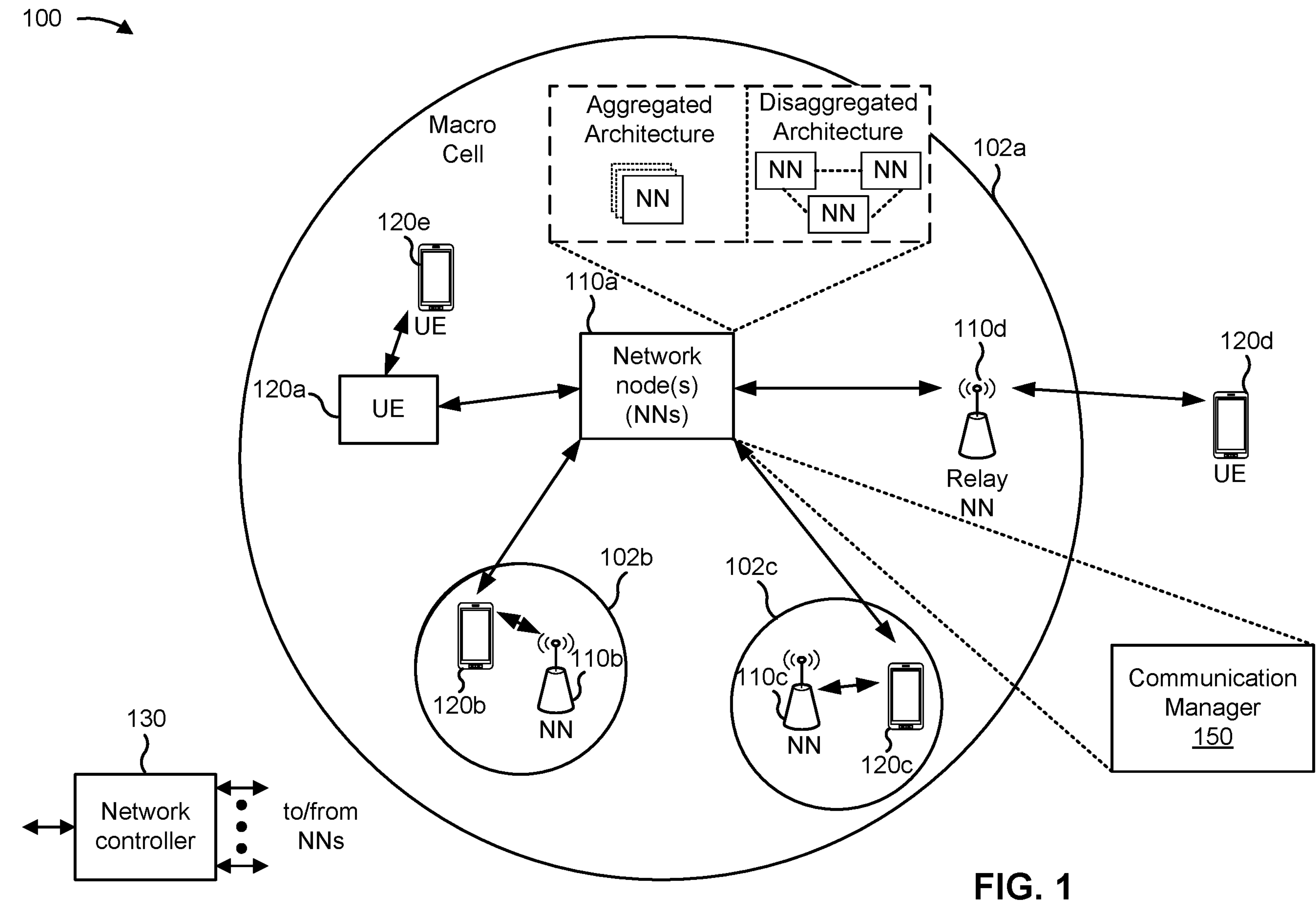
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network entity (e.g., network node 110) configured to operate as an open RU (O-RU) may include a communication manager 150. As described in more detail elsewhere herein, the communication manager 150 may transmit, to an open distributed unit (O-DU), a first set of capabilities of the network entity the first set of capabilities including one or more of at least one O-RU capability or at least one endpoint capability. The communication manager 150 may receive, from the O-DU, an indication of one or more features configured by the O-DU. The communication manager 150 may select a second set of capabilities of the network entity based at least in part on the one or more features configured by the O-DU. The communication manager 150 may transmit, to the O-DU, the second set of capabilities of the network entity. Additionally, or alternatively, the communication manager 150 may perform one or more other operations described herein.

In some aspects, a network entity (e.g., a network node 110) configured to operate as an O-DU may include a communication manager 150. As described in more detail elsewhere herein, the communication manager 150 may receive, from an O-RU, a first set of capabilities that include one or more of at least one O-RU capability or at least one endpoint capability. The communication manager 150 may transmit, to the O-RU, an indication of one or more features configured by the network entity when operating as an O-DU. The communication manager 150 may receive, from the O-RU, a second set of O-RU capabilities that is different than the first set of O-RU capabilities. Additionally, or alternatively, the communication manager 150 may perform one or more other operations described herein.

As indicated above, FIG. 1 is provided as an example. Other examples may differ from what is described with regard to FIG. 1.

Figure 2:
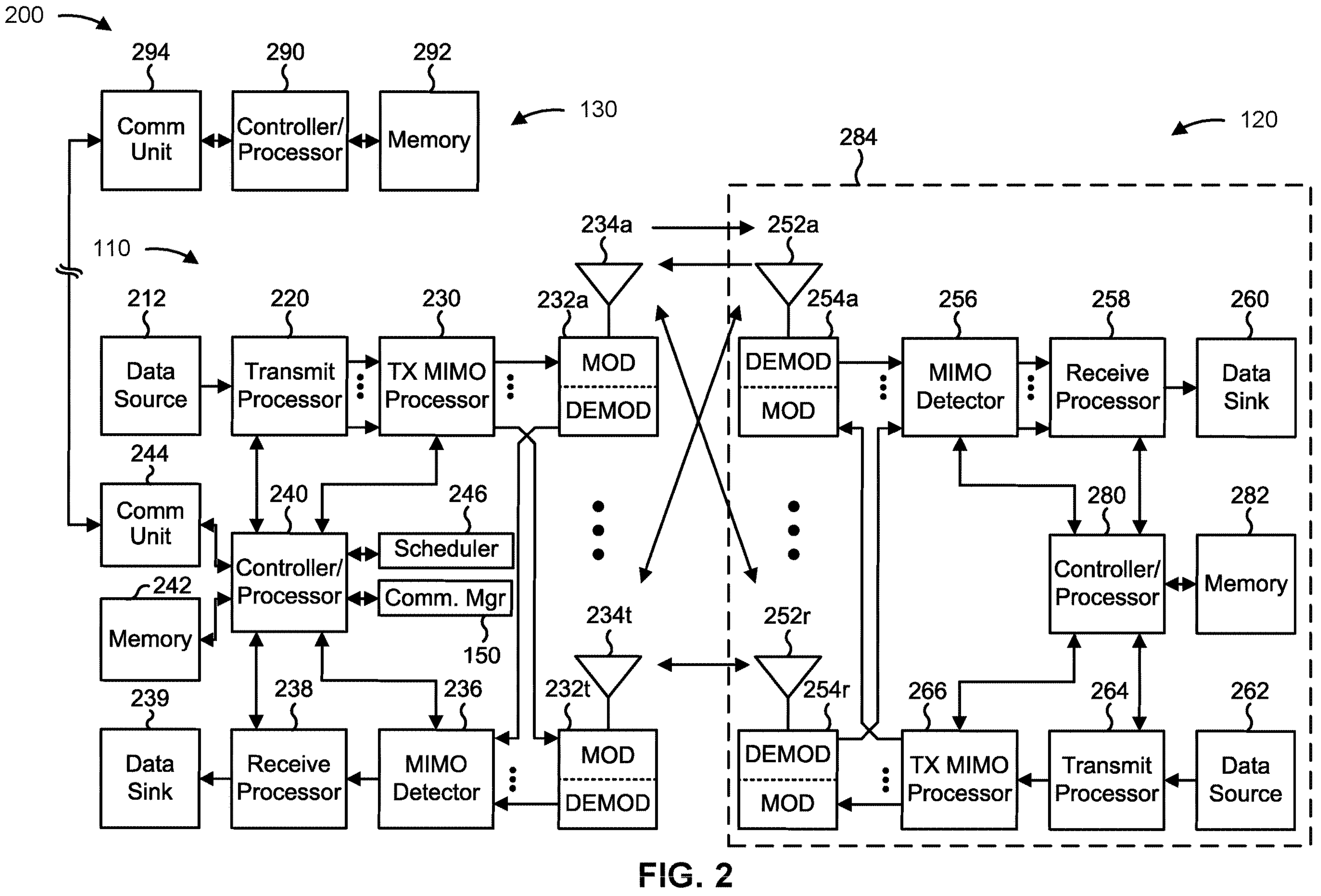
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor of a network entity (e.g., the controller/processor 240 of the network node 110), the controller/processor 280 of the UE 120, and/or any other component(s) of FIG. 2 may perform one or more techniques associated with selecting and indicating O-RU capabilities, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a network entity (e.g., a network node 110) includes means for transmitting, to an O-DU, a first set of capabilities of the network entity; means for receiving, from the O-DU, an indication of one or more features configured by the O-DU; means for selecting a second set of capabilities of the network entity based at least in part on the one or more features configured by the O-DU; and/or means for transmitting, to the O-DU, the second set of capabilities of the network entity. In some aspects, the means for the network entity to perform operations described herein May include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network entity (e.g., a network node 110) includes means for receiving, from an O-RU, a first set of capabilities that includes one or more of at least one O-RU capability or at least one endpoint capability; means for transmitting, to the O-RU, an indication of one or more features configured by the network entity when operating as an O-DU; and/or means for receiving, from the O-RU, a second set of capabilities that is different than the first set of capabilities. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
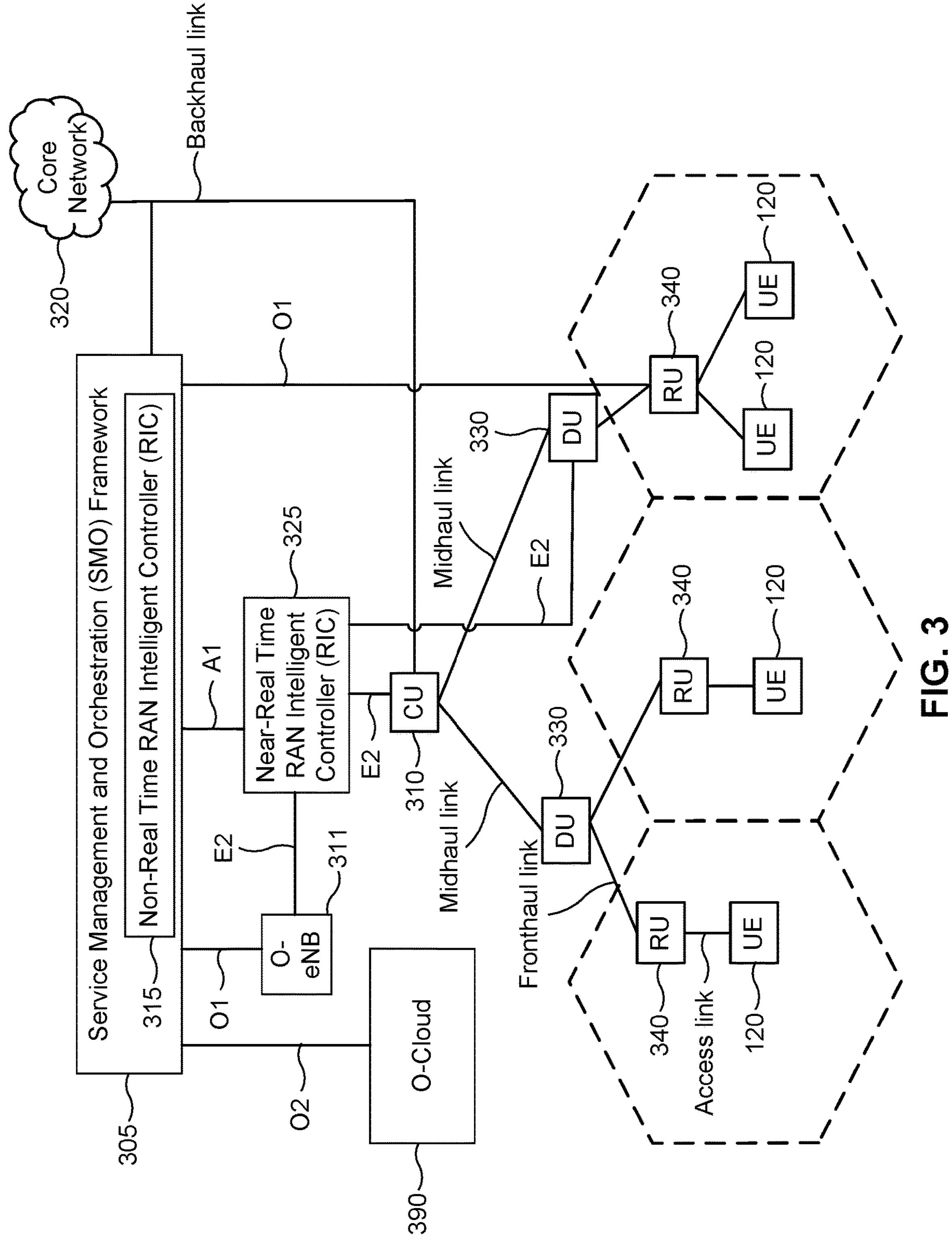
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

A DU and an RU may exchange management configurations on a management plane (M-plane) between the DU and the RU. The RU may advertise O-RU capabilities via the M-plane (e.g., via parameters in a YANG modeling language). The O-RU capabilities may include end point capabilities, which are capabilities for handling a data flow at a transmission endpoint (e.g., static low level transmission endpoint) of the data flow or a reception endpoint (e.g., static low level reception endpoint) of the data flow.

As indicated above, FIG. 3 is provided as an example. Other examples may differ from what is described with regard to FIG. 3.

Figure 4:
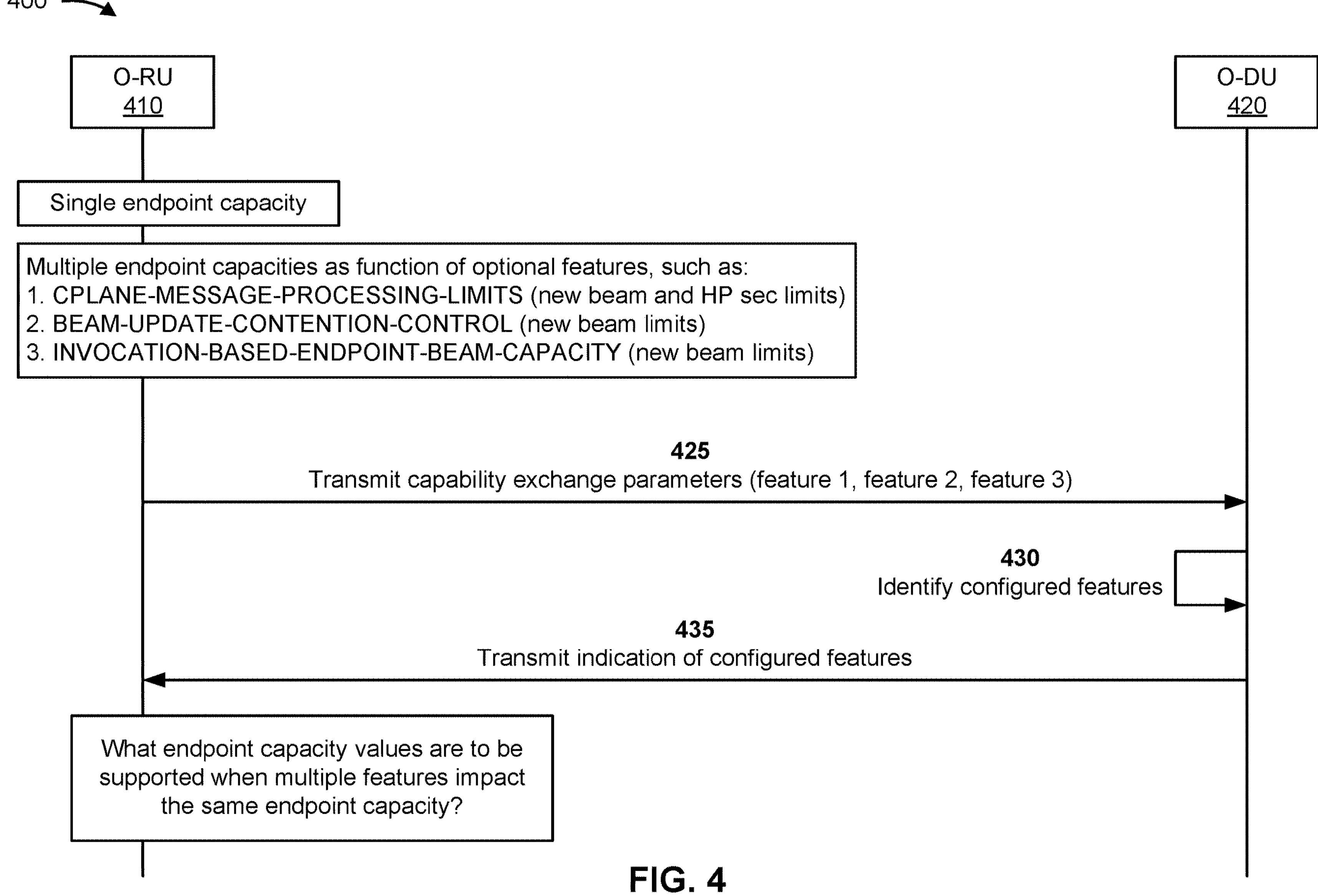
FIG. 4 is a diagram illustrating an example associated with features configured by an open distributed unit (O-DU), in accordance with the present disclosure.

FIG. 4 is a diagram illustrating an example 400 associated with features configured by an O-DU, in accordance with the present disclosure. As shown in FIG. 4, an O-RU 410 and an O-DU 420 may communicate with each other in a disaggregated base station architecture, such as disaggregated base station architecture 300.

The O-RU 410 may support radio level capabilities (capacities) that apply to the entire O-RU 410. The O-RU 410 may also support capabilities at another level, or endpoint level capabilities. An endpoint may be a construct that represents a processing unit. An O-RU may have multiple endpoints. A capability at an endpoint may be an endpoint level capability. These capabilities may include static endpoints, static low level transmission endpoints, and static low level reception endpoints. Such endpoints may be bundled together in a static configuration. The O-RU 410 may advertise the static configuration to the O-DU at startup. Initially-advertised capabilities may be considered to be base capabilities. The static configuration may include, for example, a number of spatial streams, a maximum number of carriers in the uplink, and/or a maximum number of carriers in the downlink, among other examples. The O-RU 410 may also advertise a static per endpoint level capability, which may include a maximum number of beams per symbol and/or a maximum number of beams per slot, among other examples.

Example 400 shows that O-RU 410 may support a single endpoint capability. This may involve a base endpoint capability for basic features. The O-RU 410 may be configured to support multiple endpoint capabilities as a function of multiple optional features, such as for control plane messaging (CPLANE-MESSAGE-PROCESSING-LIMITS) and beams (.g., BEAM-UPDATE-CONTENTION-CONTROL). The control plane messaging limit feature may have parameters for a base endpoint capacity, such as for a maximum number of beams per symbol, a maximum number of beams per slot, or a maximum highest priority sections per slot. The beam update contention control feature may have parameters for a base endpoint capability, such as a maximum number of beams per symbol or a maximum number of beam updates per symbol. Other O-RU optional features may include a channel information physical resource block (PRB) group (CHANNEL-INFORMATION-PRB-GROUP), user plane message processing limits (UPLANE-MESSAGE-PROCESSING LIMITS), a non-scheduled UE ID (NON-SCHEDULED-UEID), a configurable UE ID range (CONFIGURABLE-UE-ID-RANGE-SUPPORT), or multiple user MIMO user group optimization (MUMIMO_USR_GRP_OPTIMIZATION).

As shown by reference number 425, the O-RU 410 may transmit capability exchange parameters, such as a set of capabilities (e.g., base capabilities). The O-RU 410 may indicate the set of capabilities using YANG parameters, which are parameters conveyed using a YANG modeling language. The O-DU 420 may support or be configured with certain features. The O-DU 420 may identify features to support based on the set of capabilities. The O-DU 420 may be configured with supported features. As shown by reference number 430, the O-DU 420 may identify the configured features. The O-DU 420 may honor features indicated by the O-RU 410. As shown by reference number 435, the O-DU 420 may transmit an indication of features configured by the O-DU 420.

However, there are factors that affect static capabilities supported by the O-RU 410. The O-RU 410 may be able to advertise a set of features that include enhanced endpoint capabilities (capabilities beyond base capabilities), but the O-DU 420 may not support some of the features and thus it is unclear which enhanced endpoint capabilities the O-DU 420 may apply or not apply. The O-RU 410 does not have a way to indicate that if the O-DU 420 does not support a given feature or determines to disable a given feature, the O-RU 410 will have its capabilities reduced below what the O-RU 410 advertised at startup (e.g., become read only capabilities). The O-DU 420 may determine to enable or disable certain features that the O-RU 410 advertises. This can negatively impact the overall capacity of the O-RU 410. Also, the O-RU 410 may support only one optional feature that will help the O-RU 410 enhance its processing (e.g., reflected in either supporting more layers or more carriers). There is no mechanism to help the O-RU 410 advertise its enhanced capabilities if more than one enhanced feature is supported by the O-RU 410.

In addition, the O-RU 410 and the O-DU 420 may be operating with different versions of features or capabilities.

The versions may support different features or may be incompatible. For example, the O-RU 410 may use version 7 for CPLANE-MESSAGE-PROCESSING-LIMITS, version 8 for BEAM-UPDATE-CONTENTION-CONTROL and CHANNEL-INFORMATION-PRB-GROUP, version 12 for UPLANE-MESSAGE-PROCESSING LIMITS and NON-SCHEDULED-UEID, and version 14 for CONFIGURABLE-UE-ID-RANGE-SUPPORT and MUMIMO_USR_GRP_OPTIMIZATION. The O-DU 420, which is one version lower, may not interpret these new features and corresponding YANG parameters, which is the same as the O-DU 420 not supporting the features. This will impact the O-RU 410 capacities advertised by the O-RU 410. O-RUs advertise only one set of endpoints and O-RU level capabilities, which is irrespective of the O-RU version.

Furthermore, the O-DU 420 may determine to configure any combination of component carriers (CCs) after the O-RU 410 advertised per band support using module capability parameters, such as a maximum supported frequency for downlink, minimum supported frequency per downlink, a maximum supported bandwidth for downlink, a maximum carrier bandwidth for downlink, or a minimum carrier bandwidth for downlink. The configured combination may impact endpoint capacity and an endpoint capacity may be associated with a specific CC. Such impacts may reduce the processing capacity of the O-RU, which may introduce latency.

As indicated above, FIG. 4 is provided as an example. Other examples may differ from what is described with respect to FIG. 4.

Figure 5:
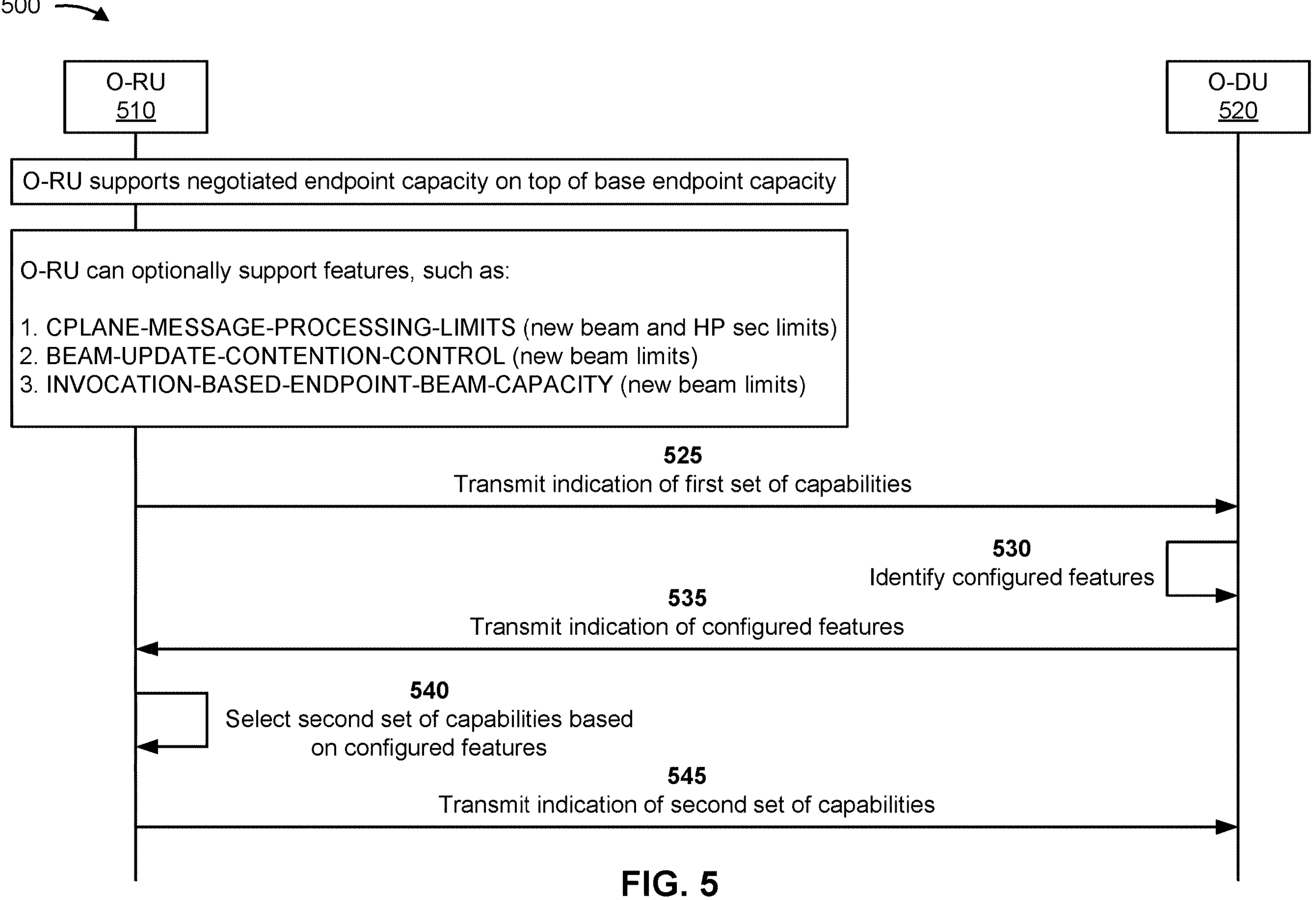
FIG. 5 is a diagram illustrating an example of indicating another set of capabilities, in accordance with the present disclosure.

FIG. 5 is a diagram illustrating an example 500 of indicating another set of capabilities, in accordance with the present disclosure. As shown in FIG. 5, an O-RU 510 (e.g., network node 110) and an O-DU 520 (e.g., network node 110) may communicate with each other in a disaggregated base station architecture, such as disaggregated base station architecture 300.

According to various aspects described herein, the endpoint and O-RU level capabilities of the O-RU may be negotiated between the O-RU and the O-DU. For example, the O-RU may transmit a first set of capabilities (e.g., overall O-RU capabilities and/or endpoint-specific capabilities). The O-DU may indicate features supported or configured at the O-DU. The O-RU may select a second set of capabilities based at least in part on the configured features. The O-RU may add, remove, or change parameters for O-RU capabilities or endpoint capabilities in the first set of capabilities to form the second set of capabilities. For example, a certain beam capability may be advertised by the O-RU as a base capability in the first set of capabilities. The O-DU may indicate support for the base capability. However, on top of the base capability, the O-DU may indicate support for an enhanced total number of beams that can be supported per endpoint or an enhanced total number of beams that can be supported by the O-RU. The O-DU may honor this second set of capabilities. The O-RU may be able to increment a beam capability and indicate that the new beam capability in the second set of capabilities. In this way, the O-RU and the O-DU may negotiate enhanced capabilities to optimize the capabilities of the O-RU.

Example 500 shows this negotiation. As shown by reference number 525, the O-RU 510 may transmit an indication of a first set of capabilities. These may be initially advertised O-RU capabilities and/or endpoint capabilities. As shown by reference number 530, the O-DU 520 may identify configured features. As shown by reference number 535, the O-DU 520 may transmit an indication of the configured features.

As shown by reference number 540, the O-RU 510 may select a second set of capabilities based at least in part on the configured features. In some aspects, the O-RU 510 may select the second set of capabilities based at least in part on configured features being associated with a same endpoint capability as indicated in the first set of capabilities. The O-RU 510 may select the second set of capabilities based at least in part on configured features being associated with a common endpoint capability for a group of endpoints, where the common endpoint capability is indicated in the first set of capabilities. The O-RU 510 may select the second set of capabilities based at least in part on configured features being associated with an enhanced O-RU capability or endpoint capability. The O-RU 510 may select the second set of capabilities based at least in part on configured features being optional O-RU features. In some aspects, the O-RU 510 may select the second set of capabilities based at least in part on configured features based at least in part on a mismatch between a feature version of the O-RU 510 and a feature version of the O-DU 520.

The O-DU choice of array-carrier configuration may impact endpoint and O-RU capabilities. In some aspects, the O-RU 510 may select the second set of capabilities based at least in part on a carrier parameter and/or a bandwidth parameter configured by the O-DU 520. For example, the O-RU transmit a list of (tx) array capabilities or receive (rx) array capabilities. Each tx/rx-array may be associated with one or more static-low-level-tx/rx-endpoints. The parameters in the capabilities may include a maximum or minimum supported frequency for downlink, a maximum number of carriers for downlink, a maximum or minimum carrier bandwidth for downlink, and/or a supported technology for downlink. The O-DU 520 may use the O-RU advertised capabilities list to configure tx-array carriers and/or rx-array carriers. In some aspects, the O-RU 510 may select the second set of capabilities based at least in part on a beamforming method and/or a delay profile configured by the O-DU. As shown by reference number 545, the O-RU 510 may transmit an indication of the second set of capabilities. In some aspects, the O-DU 520 may transmit an updated indication of features configured by the O-DU 520 based at least in part on the second set of capabilities.

As indicated above, FIG. 5 is provided as an example. Other examples may differ from what is described with regard to FIG. 5.

Figure 6:
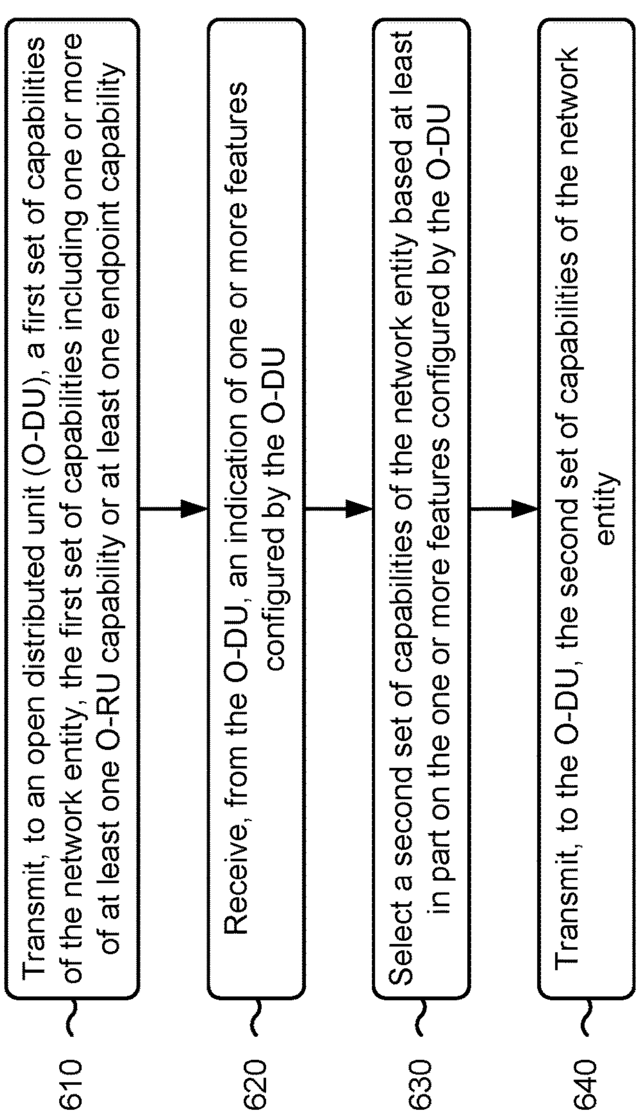
FIG. 6 is a diagram illustrating an example process performed, for example, at a network entity or an apparatus of a network entity, in accordance with the present disclosure.

FIG. 6 is a diagram illustrating an example process 600 performed, for example, at a network entity or an apparatus of a network entity, in accordance with the present disclosure. Example process 600 is an example where the apparatus or the network entity (e.g., network node 110, O-RU 510) performs operations associated with selection of capabilities.

As shown in FIG. 6, in some aspects, process 600 may include transmitting, to an O-DU, a first set of capabilities of the network entity, the first set of capabilities including one or more of at least one O-RU capability or at least one endpoint capability (block 610). For example, the network entity (e.g., using transmission component 804 and/or communication manager 806, depicted in FIG. 8) may transmit, to an O-DU, a first set of capabilities of the network entity, the first set of capabilities including one or more of at least one O-RU capability or at least one endpoint capability, as described above.

As further shown in FIG. 6, in some aspects, process 600 may include receiving, from the O-DU, an indication of one or more features configured by the O-DU (block 620). For example, the network entity (e.g., using reception component 802 and/or communication manager 806, depicted in FIG. 8) may receive, from the O-DU, an indication of one or more features configured by the O-DU, as described above.

As further shown in FIG. 6, in some aspects, process 600 may include selecting a second set of capabilities of the network entity based at least in part on the one or more features configured by the O-DU (block 630). For example, the network entity (e.g., using communication manager 806, depicted in FIG. 8) may select a second set of capabilities of the network entity based at least in part on the one or more features configured by the O-DU, as described above.

As further shown in FIG. 6, in some aspects, process 600 may include transmitting, to the O-DU, the second set of capabilities of the network entity (block 640). For example, the network entity (e.g., using transmission component 804 and/or communication manager 806, depicted in FIG. 8) may transmit, to the O-DU, the second set of capabilities of the network entity, as described above.

Process 600 may include additional aspects, such as any single aspect or any combination of aspects described below and/or in connection with one or more other processes described elsewhere herein.

In a first aspect, selecting the second set of capabilities includes removing one or more capabilities from the first set of capabilities to form the second set of capabilities based at least in part on the one or more features configured by the O-DU.

In a second aspect, alone or in combination with the first aspect, selecting the second set of capabilities includes adding one or more capabilities to the first set of capabilities to form the second set of capabilities based at least in part on the one or more features configured by the O-DU.

In a third aspect, alone or in combination with one or more of the first and second aspects, selecting the second set of capabilities includes changing one or more parameters of an O-RU capability or an endpoint capability of the first set of capabilities to form the second set of capabilities based at least in part on the one or more features configured by the O-DU.

In a fourth aspect, alone or in combination with one or more of the first through third aspects, selecting the second set of capabilities includes selecting the second set of capabilities based at least in part on two or more features of the one or more features being associated with a same endpoint capability as indicated in the first set of capabilities.

In a fifth aspect, alone or in combination with one or more of the first through fourth aspects, selecting the second set of capabilities includes selecting the second set of capabilities based at least in part on two or more features of the one or more features being associated with a common endpoint capability for a group of endpoints, wherein the common endpoint capability is indicated in the first set of capabilities.

In a sixth aspect, alone or in combination with one or more of the first through fifth aspects, selecting the second set of capabilities includes selecting the second set of capabilities based at least in part on two or more features of the one or more features being associated with an enhanced O-RU capability or endpoint capability.

In a seventh aspect, alone or in combination with one or more of the first through sixth aspects, selecting the second set of capabilities includes selecting the second set of capabilities based at least in part on two or more features of the one or more features being optional O-RU features.

In an eighth aspect, alone or in combination with one or more of the first through seventh aspects, selecting the second set of O-RU capabilities includes selecting the second set of O-RU capabilities based at least in part on a mismatch between a feature version of the network entity and a feature version of the O-DU.

In a ninth aspect, alone or in combination with one or more of the first through eighth aspects, selecting the second set of capabilities includes selecting the second set of capabilities based at least in part on one or more of a carrier parameter or a bandwidth parameter configured by the O-DU.

In a tenth aspect, alone or in combination with one or more of the first through ninth aspects, selecting the second set of capabilities includes selecting the second set of capabilities based at least in part on one or more of a beamforming method or a delay profile configured by the O-DU.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
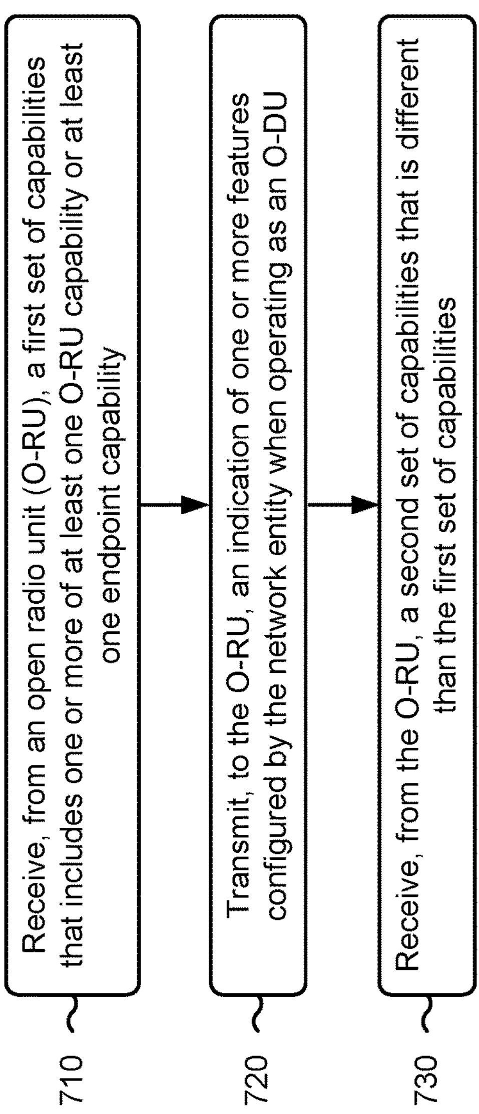
FIG. 7 is a diagram illustrating an example process performed, for example, at a network entity or an apparatus of a network entity, in accordance with the present disclosure.

FIG. 7 is a diagram illustrating an example process 700 performed, for example, at a network entity or an apparatus of a network entity, in accordance with the present disclosure. Example process 700 is an example where the apparatus or the network entity (e.g., network node 110, O-DU 520) performs operations associated with selection of capabilities.

As shown in FIG. 7, in some aspects, process 700 may include receiving, from an O-RU, a first set of capabilities that includes one or more of at least one O-RU capability or at least one endpoint capability (block 710). For example, the network entity (e.g., using reception component 902 and/or communication manager 906, depicted in FIG. 9) may receive, from an O-RU, a first set of capabilities that includes one or more of at least one O-RU capability or at least one endpoint capability, as described above.

As further shown in FIG. 7, in some aspects, process 700 may include transmitting, to the O-RU, an indication of one or more features configured by the network entity when operating as an O-DU (block 720). For example, the network entity (e.g., using transmission component 904 and/or communication manager 906, depicted in FIG. 9) may transmit, to the O-RU, an indication of one or more features configured by the network entity when operating as an O-DU, as described above.

As further shown in FIG. 7, in some aspects, process 700 may include receiving, from the O-RU, a second set of capabilities that is different than the first set of capabilities (block 730). For example, the network entity (e.g., using reception component 902 and/or communication manager 906, depicted in FIG. 9) may receive, from the O-RU, a second set of capabilities that is different than the first set of capabilities, as described above.

Process 700 may include additional aspects, such as any single aspect or any combination of aspects described below and/or in connection with one or more other processes described elsewhere herein.

In a first aspect, the one or more features include two or more features being associated with a same endpoint capability as indicated in the first set of capabilities.

In a second aspect, alone or in combination with the first aspect, the one or more features include two or more features being associated with a common endpoint capability for a group of endpoints, where the common endpoint capability is indicated in the first set of capabilities.

In a third aspect, alone or in combination with one or more of the first and second aspects, the one or more features include two or more features associated with an enhanced O-RU capability or endpoint capability.

In a fourth aspect, alone or in combination with one or more of the first through third aspects, the one or more features include two or more optional O-RU features.

In a fifth aspect, alone or in combination with one or more of the first through fourth aspects, process 700 includes transmitting an updated indication of one or more features configured by the network entity operating as an O-DU.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
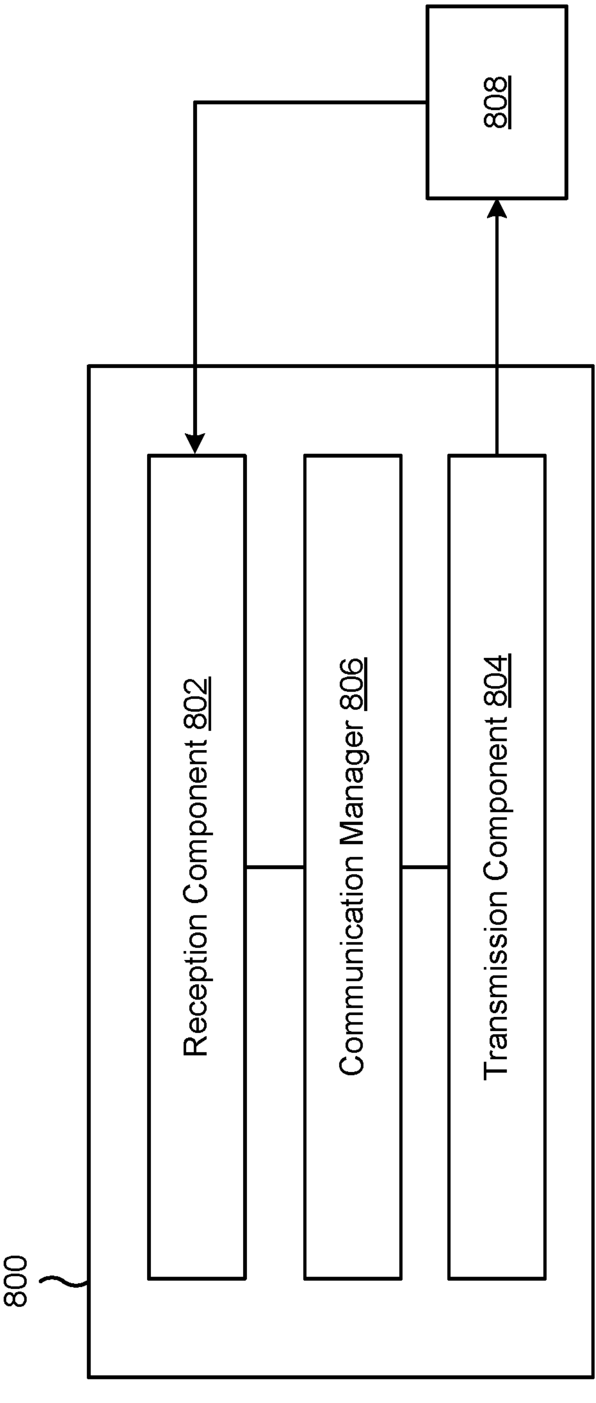
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a network entity (e.g., O-RU 510), or a network entity may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 150 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the network entity described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, one or more modems, one or more demodulators, one or more MIMO detectors, one or more receive processors, one or more controllers/processors, one or more memories, or a combination thereof, of the network entity described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, one or more modems, one or more modulators, one or more transmit MIMO processors, one or more transmit processors, one or more controllers/processors, one or more memories, or a combination thereof, of the network entity described in connection with FIG. 2. In some aspects, the transmission component 804 may be co-located with the reception component 802 in one or more transceivers.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The transmission component 804 may transmit, to an O-DU, a first set of capabilities of the network entity, the first set of capabilities including one or more of at least one O-RU capability or at least one endpoint capability. The reception component 802 may receive, from the O-DU, an indication of one or more features configured by the O-DU. The communication manager 806 may select a second set of capabilities of the network entity based at least in part on the one or more features configured by the O-DU. The transmission component 804 may transmit, to the O-DU, the second set of capabilities of the network entity.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
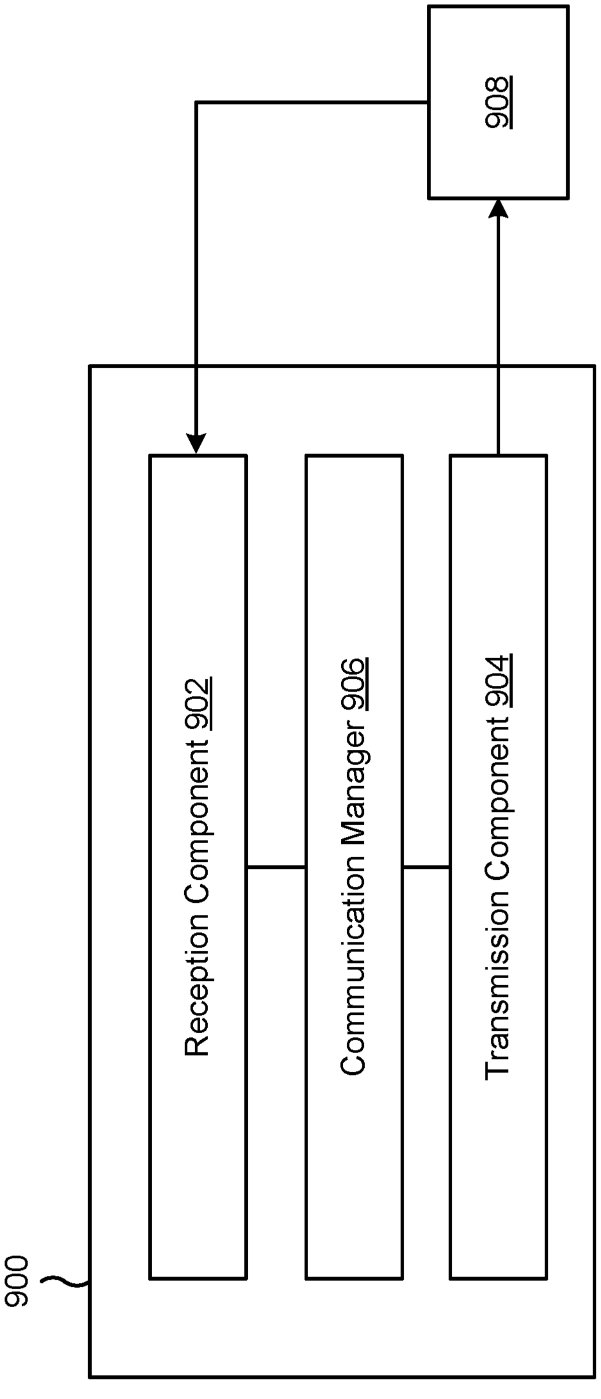
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network entity (e.g., O-DU 520), or a network entity may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network entity described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the network entity described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the network entity described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from an O-RU, a first set of capabilities that includes one or more of at least one O-RU capability or at least one endpoint capability. The transmission component 904 may transmit, to the O-RU, an indication of one or more features configured by the network entity when operating as an O-DU. The reception component 902 may receive, from the O-RU, a second set of capabilities that is different than the first set of capabilities.

The transmission component 904 may transmit an updated indication of one or more features configured by the network entity operating as an O-DU.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a network entity, comprising: transmitting, to an open distributed unit (O-DU), a first set of capabilities of the network entity, the first set of capabilities including one or more of at least one O-RU capability or at least one endpoint capability; receiving, from the O-DU, an indication of one or more features configured by the O-DU; selecting a second set of capabilities of the network entity based at least in part on the one or more features configured by the O-DU; and transmitting, to the O-DU, the second set of capabilities of the network entity.

Aspect 2: The method of Aspect 1, wherein selecting the second set of capabilities includes removing one or more capabilities from the first set of capabilities to form the second set of capabilities based at least in part on the one or more features configured by the O-DU.

Aspect 3: The method of any of Aspects 1-2, wherein selecting the second set of capabilities includes adding one or more capabilities to the first set of capabilities to form the second set of capabilities based at least in part on the one or more features configured by the O-DU.

Aspect 4: The method of any of Aspects 1-3, wherein selecting the second set of capabilities includes changing one or more parameters of an O-RU capability or an endpoint capability of the first set of capabilities to form the second set of capabilities based at least in part on the one or more features configured by the O-DU.

Aspect 5: The method of any of Aspects 1-4, wherein selecting the second set of capabilities includes selecting the second set of capabilities based at least in part on two or more features of the one or more features being associated with a same endpoint capability as indicated in the first set of capabilities.

Aspect 6: The method of any of Aspects 1-5, wherein selecting the second set of capabilities includes selecting the second set of capabilities based at least in part on two or more features of the one or more features being associated with a common endpoint capability for a group of endpoints, wherein the common endpoint capability is indicated in the first set of capabilities.

Aspect 7: The method of any of Aspects 1-6, wherein selecting the second set of capabilities includes selecting the second set of capabilities based at least in part on two or more features of the one or more features being associated with an enhanced O-RU capability or endpoint capability.

Aspect 8: The method of any of Aspects 1-7, wherein selecting the second set of capabilities includes selecting the second set of capabilities based at least in part on two or more features of the one or more features being optional O-RU features.

Aspect 9: The method of any of Aspects 1-8, wherein selecting the second set of O-RU capabilities includes selecting the second set of O-RU capabilities based at least in part on a mismatch between a feature version of the network entity and a feature version of the O-DU.

Aspect 10: The method of any of Aspects 1-9, wherein selecting the second set of capabilities includes selecting the second set of capabilities based at least in part on one or more of a carrier parameter or a bandwidth parameter configured by the O-DU.

Aspect 11: The method of any of Aspects 1-10, wherein selecting the second set of capabilities includes selecting the second set of capabilities based at least in part on one or more of a beamforming method or a delay profile configured by the O-DU.

Aspect 12: A method of wireless communication performed by a network entity, comprising: receiving, from an open radio unit (O-RU), a first set of capabilities that includes one or more of at least one O-RU capability or at least one endpoint capability; transmitting, to the O-RU, an indication of one or more features configured by the network entity when operating as an open distributed unit (O-DU); and receiving, from the O-RU, a second set of capabilities that is different than the first set of capabilities.

Aspect 13: The method of Aspect 12, wherein the one or more features include two or more features being associated with a same endpoint capability as indicated in the first set of capabilities.

Aspect 14: The method of any of Aspects 12-13, wherein the one or more features include two or more features being associated with a common endpoint capability for a group of endpoints, wherein the common endpoint capability is indicated in the first set of capabilities.

Aspect 15: The method of any of Aspects 12-14, wherein the one or more features include two or more features associated with an enhanced O-RU capability or endpoint capability.

Aspect 16: The method of any of Aspects 12-15, wherein the one or more features include two or more optional O-RU features.

Aspect 17: The method of any of Aspects 12-16, further comprising transmitting an updated indication of one or more features configured by the network entity operating as an O-DU.

Aspect 18: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-17.

Aspect 19: An apparatus for wireless communication at a device, the apparatus comprising one or more memories and one or more processors coupled to the one or more memories, the one or more processors configured to cause the device to perform the method of one or more of Aspects 1-17.

Aspect 20: An apparatus for wireless communication, the apparatus comprising at least one means for performing the method of one or more of Aspects 1-17.

Aspect 21: A non-transitory computer-readable medium storing code for wireless communication, the code comprising instructions executable by one or more processors to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

Aspect 23: A device for wireless communication, the device comprising a processing system that includes one or more processors and one or more memories coupled with the one or more processors, the processing system configured to cause the device to perform the method of one or more of Aspects 1-17.

Aspect 24: An apparatus for wireless communication at a device, the apparatus comprising one or more memories and one or more processors coupled to the one or more memories, the one or more processors individually or collectively configured to cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at an open radio unit (O-RU), comprising:
one or more memories; and
one or more processors, coupled to the one or more memories, individually or collectively configured to cause the O-RU to:
transmit, to an open distributed unit (O-DU), a first set of capabilities including a base capability of one or more of at least one O-RU capability or at least one endpoint capability;
receive, from the O-DU, an indication of support for the base capability and one or more enhanced capabilities beyond the base capability;
select, based at least in part on the indication from the O-DU, a second set of capabilities including the one or more enhanced capabilities; and
transmit, to the O-DU, the second set of capabilities.

2. The apparatus of claim 1, wherein to select the second set of capabilities, the one or more processors are individually or collectively configured to cause the O-RU to remove one or more capabilities from the first set of capabilities to form the second set of capabilities.

3. The apparatus of claim 1, wherein to select the second set of capabilities, the one or more processors are individually or collectively configured to cause the O-RU to add one or more capabilities to the base capability to form the second set of capabilities.

4. The apparatus of claim 1, wherein to select the second set of capabilities, the one or more processors are individually or collectively configured to cause the O-RU to change one or more parameters of an O-RU capability or an endpoint capability of the first set of capabilities to form the second set of capabilities.

5. The apparatus of claim 1, wherein to select the second set of capabilities, the one or more processors are individually or collectively configured to cause the O-RU to select the second set of capabilities further based at least in part on two or more features of the one or more features being associated with a same endpoint capability as indicated in the first set of capabilities.

6. The apparatus of claim 1, wherein to select the second set of capabilities, the one or more processors are individually or collectively configured to cause the O-RU to select the second set of capabilities further based at least in part on two or more features of the one or more features being associated with a common endpoint capability for a group of endpoints, wherein the common endpoint capability is indicated in the first set of capabilities.

7. The apparatus of claim 1, wherein to select the second set of capabilities, the one or more processors are individually or collectively configured to cause the O-RU to select the second set of capabilities further based at least in part on two or more features of the one or more features being associated with an enhanced O-RU capability or endpoint capability.

8. The apparatus of claim 1, wherein to select the second set of capabilities, the one or more processors are individually or collectively configured to cause the O-RU to select the second set of capabilities further based at least in part on two or more features of the one or more features being optional O-RU features.

9. The apparatus of claim 1, wherein to select the second set of capabilities, the one or more processors are individually or collectively configured to cause the O-RU to select the second set of capabilities further based at least in part on a mismatch between a feature version of the O-RU and a feature version of the O-DU.

10. The apparatus of claim 1, wherein to select the second set of capabilities, the one or more processors are individually or collectively configured to cause the O-RU to select the second set of capabilities further based at least in part on one or more of a carrier parameter or a bandwidth parameter configured by the O-DU.

11. The apparatus of claim 1, wherein to select the second set of capabilities, the one or more processors are individually or collectively configured to cause the O-RU to select the second set of capabilities based at least in part on one or more of a beamforming method or a delay profile configured by the O-DU.

12. The apparatus of claim 1, wherein to select the second set of capabilities, the one or more processors are individually or collectively configured to cause the O-RU to select the second set of capabilities based at least in part on a beamforming method.

13. The apparatus of claim 12, wherein the one or more of at least one O-RU capability or at least one endpoint capability includes a certain beam capability, and one or more enhanced capabilities includes an enhanced total number of beams that is able to be supported per endpoint or by the O-RU.

14. An apparatus for wireless communication at an open distributed unit (O-DU), comprising:

one or more memories; and one or more processors, coupled to the one or more memories, individually or collectively configured to cause the O-DU to:

receive, from an open radio unit (O-RU), a first set of capabilities that include one or more of at least one O-RU capability or at least one endpoint capability;

transmit, to the O-RU, an indication of one or more features configured by the O-DU; and receive, from the O-RU, a second set of capabilities that is different than the first set of capabilities and is based at least in part on the one or more features being associated with at least one enhanced O-RU capability or endpoint capability.

15. The apparatus of claim 14, wherein the one or more features include two or more features being associated with a same endpoint capability as indicated in the first set of capabilities.

16. The apparatus of claim 14, wherein the one or more features include two or more features being associated with a common endpoint capability for a group of endpoints, wherein the common endpoint capability is indicated in the first set of capabilities.

17. The apparatus of claim 14, wherein the one or more features include two or more features include two or more optional O-RU features or two or more features associated with an enhanced O-RU capability or endpoint capability.

18. The apparatus of claim 14, wherein the one or more processors are individually or collectively configured to cause the O-DU to transmit an updated indication of one or more features configured by the O-DU.

19. A method of wireless communication performed by an open radio unit (O-RU), comprising:

transmitting, to an open distributed unit (O-DU), a first set of capabilities including a base capability of one or more of at least one O-RU capability or at least one endpoint capability;

receiving, from the O-DU, an indication of support for the base capability and one or more enhanced capabilities beyond the base capability;

selecting, based at least in part on the indication from the O-DU, a second set of capabilities include the one or more enhanced capabilities; and transmitting, to the O-DU, the second set of capabilities.

20. The method of claim 19, wherein selecting the second set of capabilities is further based at least in part on two or more features of the one or more features being associated with a same endpoint capability as indicated in the first set of capabilities.

21. The method of claim 19, wherein selecting the second set of capabilities is further based at least in part on two or more features of the one or more features being associated with a common endpoint capability for a group of endpoints, wherein the common endpoint capability is indicated in the first set of capabilities.

22. The method of claim 19, wherein selecting the second set of capabilities is further based at least in part on two or more features of the one or more features being optional O-RU features.

23. The method of claim 19, wherein selecting the second set of capabilities includes is further based at least in part on a mismatch between a feature version of the O-RU and a feature version of the O-DU.

24. The method of claim 19, wherein selecting the second set of capabilities is further based at least in part on one or more of a carrier parameter or a bandwidth parameter configured by the O-DU.

25. The method of claim 19, wherein selecting the second set of capabilities is further based at least in part on one or more of a beamforming method or a delay profile configured by the O-DU.

26. A method of wireless communication performed by an open distributed unit (O-DU), comprising:

receiving, from an open radio unit (O-RU), a first set of capabilities that includes one or more of at least one O-RU capability or at least one endpoint capability;

transmitting, to the O-RU, an indication of one or more features configured by the O-DU; and receiving, from the O-RU, a second set of capabilities that is different than the first set of capabilities and is based at least in part on the one or more features being associated with at least one enhanced O-RU capability or endpoint capability.

27. The method of claim 26, wherein the one or more features include two or more features being associated with a same endpoint capability as indicated in the first set of capabilities.

28. The method of claim 26, wherein the one or more features include two or more features being associated with a common endpoint capability for a group of endpoints, wherein the common endpoint capability is indicated in the first set of capabilities.

29. The method of claim 26, wherein the one or more features include two or more optional O-RU features.

30. The method of claim 26, further comprising transmitting an updated indication of one or more features configured by the O-DU.

* * * * *